United States Patent [19]

Olsen

[11] Patent Number: 5,007,853
[45] Date of Patent: Apr. 16, 1991

[54] CASING SYSTEM FOR THE LAYING OF ELECTRICAL SUPPLY CONDUCTORS

[76] Inventor: Axel Olsen, Fjordskraenten 7, Graese Bakkeby, Frederikssund 3600, Denmark

[21] Appl. No.: 483,983

[22] Filed: Feb. 21, 1990

Related U.S. Application Data

[63] Continuation-in-part of Ser. No. 254,798, Oct. 4, 1988, abandoned.

[30] Foreign Application Priority Data

Feb. 19, 1987 [DK] Denmark ............................. 847/87

[51] Int. Cl.⁵ ............................................. H01R 4/64
[52] U.S. Cl. ..................................... 439/211; 439/209
[58] Field of Search .................... 174/48, 49; 439/110, 439/113, 115, 120, 121, 200–211, 214–216

[56] References Cited

U.S. PATENT DOCUMENTS

| | | | |
|---|---|---|---|
| 2,284,837 | 6/1942 | O'Brien | 439/216 |
| 2,450,908 | 10/1948 | O'Brien et al. | 174/49 |
| 2,611,800 | 9/1952 | Naughton | 439/216 |
| 3,839,696 | 10/1974 | Gothberg | 439/216 |

*Primary Examiner*—Eugene F. Desmond
*Attorney, Agent, or Firm*—Watson, Cole, Grindle & Watson

[57] ABSTRACT

A casing system for laying electric supply conductors and, if desired, signal conductors along the outer surfaces of walls comprises pre-fabricated, unitary, permanently closed casing sections of a variety of fixed lengths with built-in conductors. Each casing section is provided with a number of built-in access modules permitting the mounting of installation components, such as wall sockets, and the establishment of electrical connection between these and the built-in conductors without interfering with the integrity of the casing sections. The system further comprises sliding cover sections for covering the gaps between adjacent casing sections and between casing sections and corner and end sections also belonging to the system. Standard lengths of casing sections, corner sections, and sections, and sliding cover sections are so selected thay any length of wall can be covered by the system without cutting or otherwise interfering with the casing sections as manufactured.

12 Claims, 12 Drawing Sheets

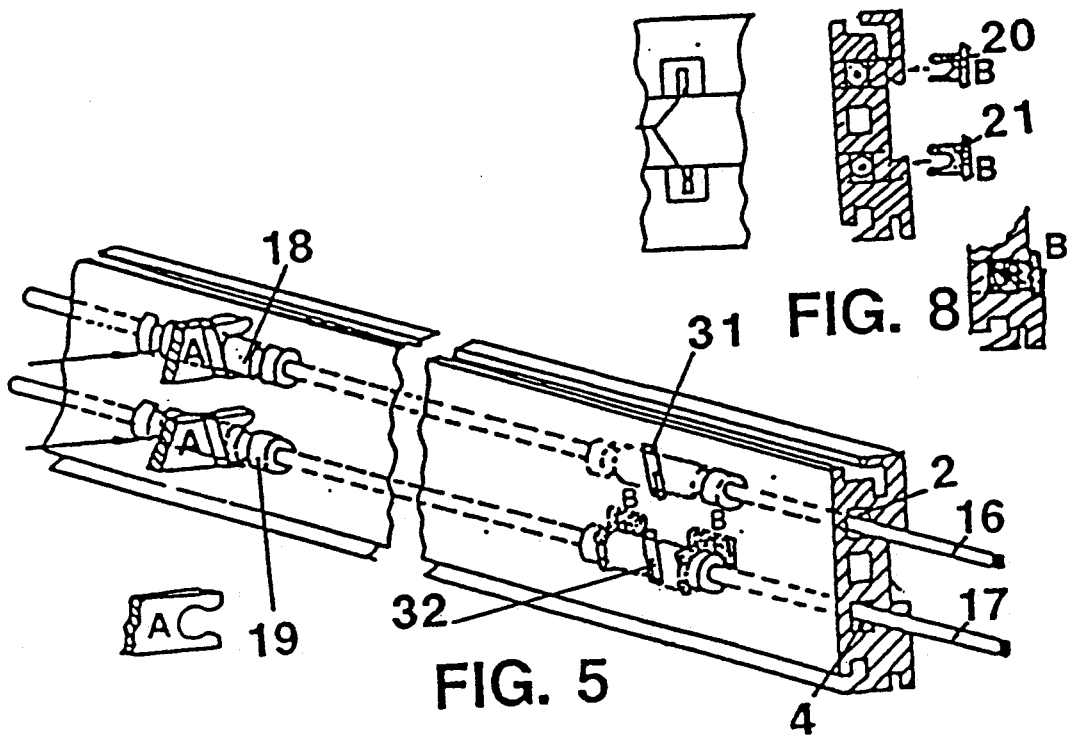
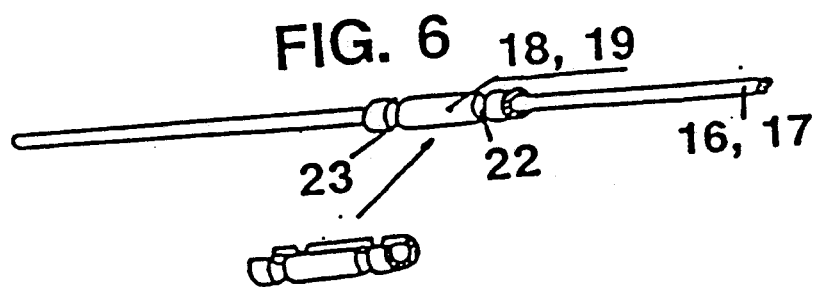

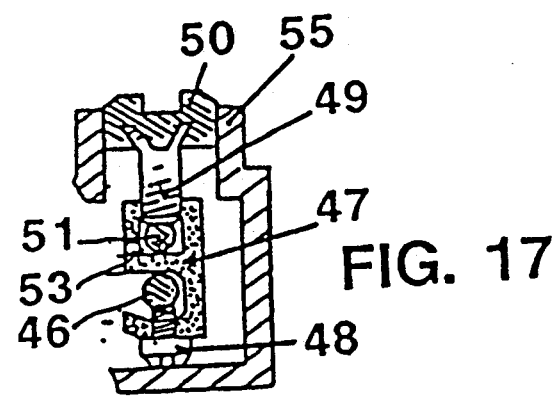
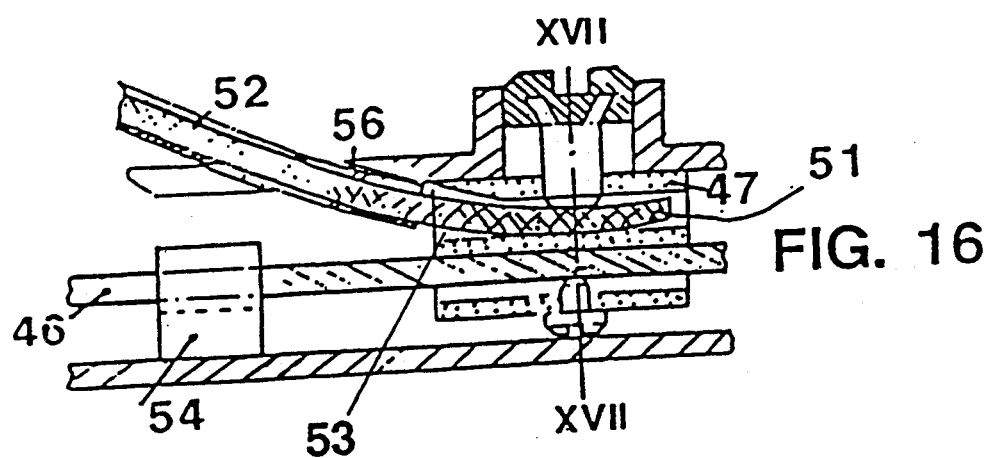

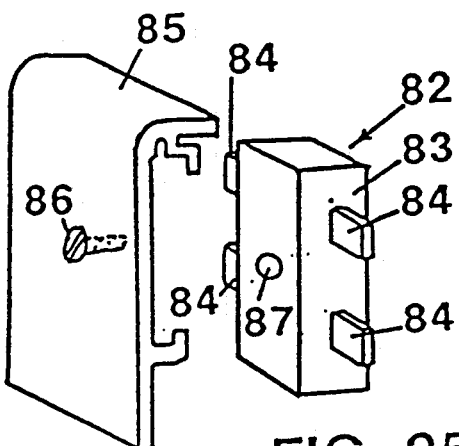
FIG. 25
FIG. 26
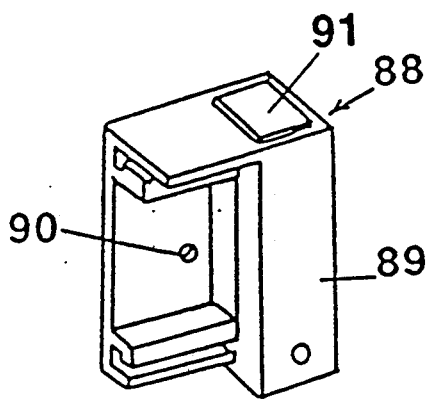
FIG. 27
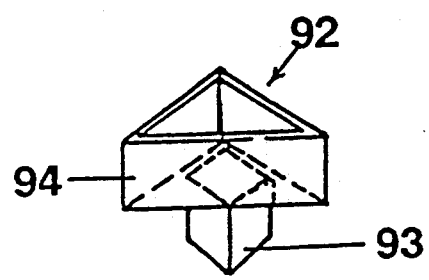
FIG. 28
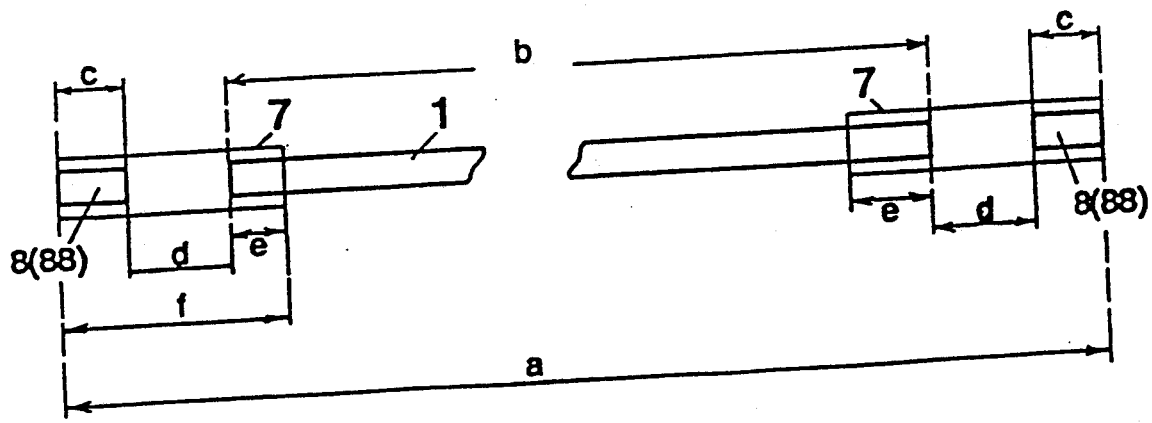
FIG. 29

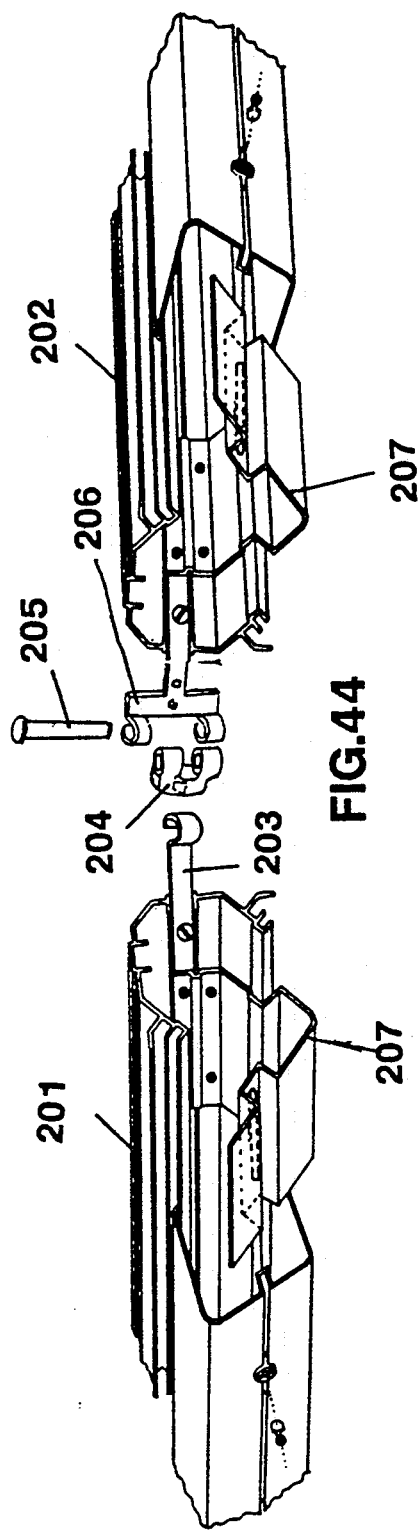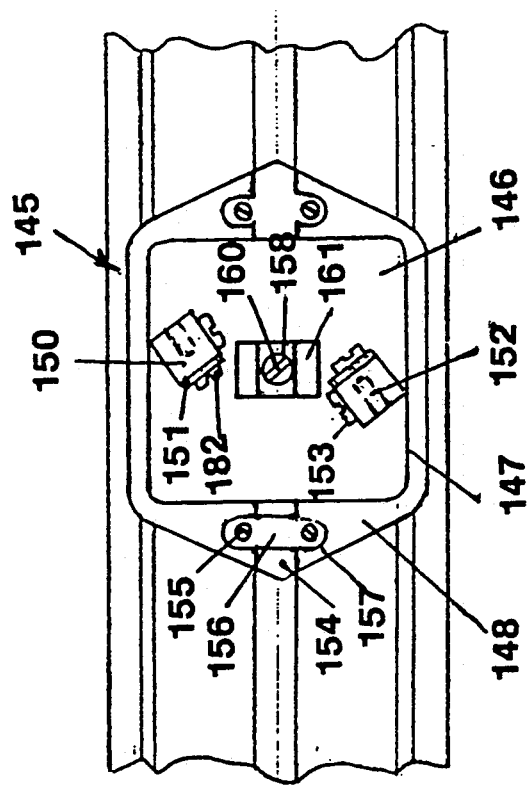

CASING SYSTEM FOR THE LAYING OF ELECTRICAL SUPPLY CONDUCTORS

This application is a Continuation-In-Part of U.S. Serial No. 254,798 filed Oct. 4, 1988.

FIELD OF THE INVENTION

The invention relates to a casing system for laying electrical supply conductors and, if desired, signal conductors along the outer surfaces of walls, said casing system comprising as its principal component a casing of insulating material with at least two longitudinal cavities for accomodating the conductors.

BACKGROUND OF THE INVENTION

Such casing systems are known in a multitude of variations and are being used to an increasing extent instead of or supplementary to the more traditional forms of fixed electric supply systems in buildings, such as insulated wires drawn through embedded or exposed metal or plastics tubes, or special installation cables for outward mounting on walls and the like.

The utility of casing systems of the kind referred to depends very much on the amount of work, and particularly skilled work, required for mounting the casing system on one or more walls of a room in a neat manner, for wiring the casing system and for mounting and connecting up installation components, such as wall sockets or other electrical connectors, in selected positions, and also on the flexibility in selecting such positions, and on the safety against abusive and hazardous tampering by non-skilled persons.

SUMMARY OF THE INVENTION

It is the object of the invention to provide a casing system of the kind referred to, which is optimized in respect of all the factors mentioned above.

With this object in view, according to the invention, a casing system of the kind referred to comprises unitary elongated casing sections of insulating material and of a variety of fixed lengths, each such section having a front wall and a rear wall and at least two longitudinal cavities extending from end to end of the section in positions mutually displaced in a transverse direction parallel to said front wall, an electric supply conductor being mounted in each of at least two such longitudinal cavities at a loose fit and being helt therein against longitudinal displacement, each casing section being constructed with a number of access modules distributed over the length of the section and each providing access for the touch and creep proof connection of outer conductors or installation components from the front side of the casing section to the supply conductors in the longitudinal cavities, sliding cover sections profiled for positive sliding engagement with said casing sections and having a shape and a length such as to be capable of covering a gap of substantial length between two aligned casing sections, corner sections having two legs disposed at an angle to each other, and end sections having one leg, each leg being shaped for positive sliding engagement with a sliding cover section in such a manner as to define a confined space between the sliding cover and the leg and to be capable of covering a gap of substantial length between the leg considered and the end of an aligned casing section, said sliding cover sections being constructed for fixation relative to a wall of a building along which one or more casing sections are mounted.

In the use of this system, it will always be possible, when the length of wall to be covered is known, to determine the optimum combination of available casing section lengths, and it is then a very simple job to secure these to the wall, while at the same time placing the required number of sliding cover sections in engagement with the profile of the casing sections. In this manner it becomes possible, without cutting or in any other way adapting the parts as manufactured and delivered, to establish casings running from corner to corner or from corner to door frame along one or more walls of a room. Usually the casings will be placed as floor or ceiling skirtings or alongside existing floor or ceiling skirtings. Casings meeting at an inner or outer corner may be interconnected through corner sections. Casings running along the floor and the ceiling respectively may be interconnected by means of casings of the same kind as those running along the floor and the ceiling, or through simple triangular or flat tubings accomodating insulated conductors for interconnecting the conductors in the floor and ceiling casings.

After the casings have been secured to the walls, the wiring must be completed by establishing electrical connection with external conductors, and between the built-in conductors of adjacent casing sections to the extent this has not already been accomplished in the mounting of the casings, as will later be explained. Where such additional wiring is required, the sliding cover sections will be pushed aside so as to expose the gaps between the casing sections. The interconnection of the ends of the built-in conductors may require some basic skill of an electrician, but may be performed easily and quickly, and this work may even be further facilitated by providing the built-in conductors with suitable terminals, as will later be explained.

After the mounting of the casings and the wiring have been completed, the system is ready for the mounting of installation components, such as wall sockets or other electrical connectors at the location of any one of the access modules, which may e.g. be distributed along the casing sections at a spacing of 1 m or less. The mounting of installation components is an extremely simple operation, which can be performed without hazard—even if the built-in conductors happen, by negligence, to be live—because it does not involve any manipulation of the built-in conductors, but these are on the contrary, with a safety margin, outside the reach of the operator. For the same reason, the access modules at any time not in use are perfectly safe. The moving of an installation component from the location of one access module to that of another is an equally simple operation, so that the system is very flexible for adaptation to changing installation needs.

A further advantage of the invention is that, because the casing sections are profiled elements which remain closed and intact from the moment they are manufactured till the time when the installation on the spot of use has been completed, the casing sections can be made with a relatively feeble cross section and will still have a satisfactory mechanical strength and rigidity in all handling steps to which they are subjected on their way. The consumption of raw materials for the production can therefore be kept low, and owing to their slimness, the casing sections, when mounted in a room, will be little obtrusive and may even have a decorative effect.

Further features and advantages of the invention will be apparent to those skilled in the art from the following description.

BRIEF DESCRIPTION OF THE DRAWINGS

FIG. 5 a diagrammatic perspective transparent view of the casing section of FIG. 2 with built-in conductors and contact legs of an installation component mounted on the casing section.

FIG. 6 illustrates the mounting of a contact piece on a conductor adapted to be built into the casing section of FIG. 5.

FIG. 7 is a cross section through the same casing section and two holding plugs for insertion through slots in the rear wall of the casing section.

FIG. 8 is a corresponding partial section with the holding plug inserted.

FIG. 9 a fragmentary rear view of the casing section in the area of the cross section of FIG. 7.

FIG. 16 is a longitudinal section through a casing section according to the invention made from the parts of FIG. 10–15, with an outer conductor connected to a built-in conductor, the section being taken along a line corresponding to the line XVI—XVI in FIG. 13.

FIG. 17 is a part section taken along the line XVII—XVII in FIG. 16.

FIG. 25 is a perspective view of a connector section that may be used for interconnecting two adjacent casing sections.

FIG. 26 is a sliding cover section for use in connection with the connector section of FIG. 23.

FIG. 27 is a perspective view of an end section.

FIG. 28 is a perspective view of a transition section, that may be used for establishing connection between an end section or a corner section and a corner casing of triangular cross section.

FIG. 29 is a front view of a casing length built up from two end or corner sections, one casing section and two sliding covers.

FIG. 42 is a front view of a connector base member mounted on a casing section and also illustrated in FIGS. 37 and 38, a cover being omitted in FIG. 42.

FIG. 44 is a diagrammatic, developed view of a corner section having two hingedly connected legs.

DESCRIPTION OF THE PREFERRED EMBODIMENTS

Figure 1:
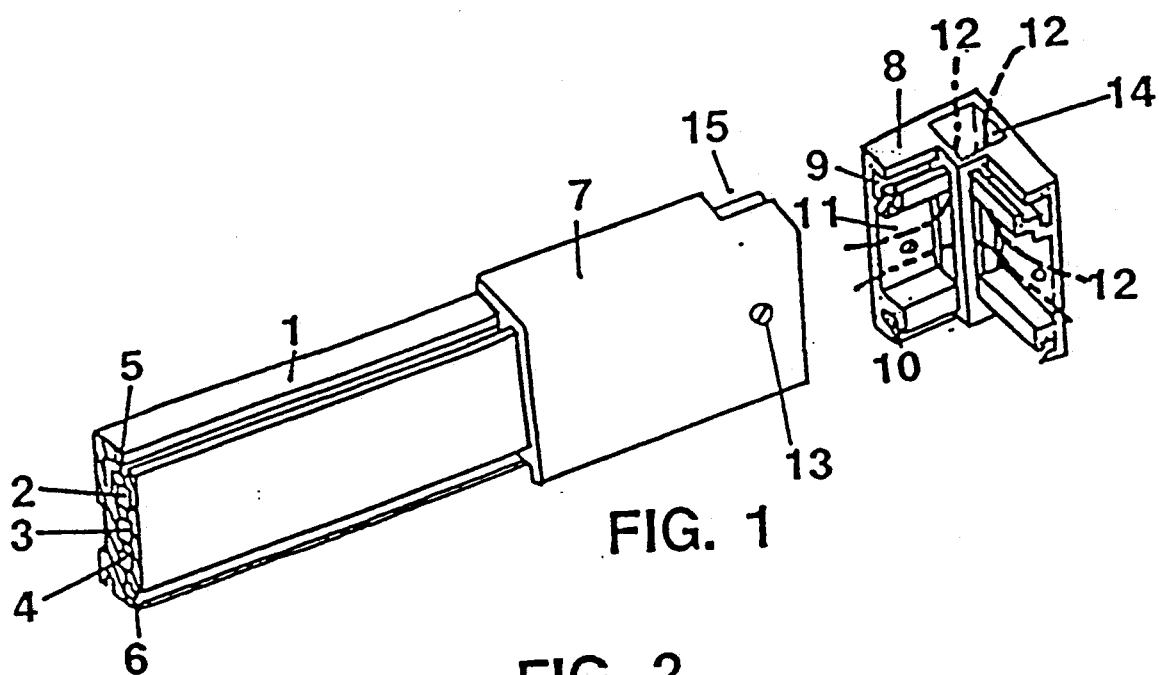
FIG. 1 is a perspective illustration of a casing section, a corner section, and a sliding cover section, by means of which these can be connected with each other, in accordance with one embodiment of the invention.

In FIG. 1, 1 is a casing section, which is the main component of a casing system according to one embodiment of the invention. The casing section 1 consists of insulating material, such as an extruded plastics material. The casing section is profiled as shown and contains three longitudinal cavities 2, 3 and 4. The casing section is unitary, i.e. in one piece, and is thus permanently closed. The cavities 2 and 4 serve to accomodate built-in conductors (not shown in FIG. 1), that may be non-insulated hard copper conductors. The cavity 3 is reserved for the passage of screws for fastening to a wall and also provides a separation of the passages 2 and 4.

The profile of the casing section 1 comprises two grooves 5 and 6 serving as sliding guides for sliding cover sections. Such a sliding cover section is shown at 7 and serves to connect the casing section 1 with a corner section 8, the legs of which have grooves 9 and 10 corresponding to the grooves 5 and 6, and therebetween an open space for the accomodation of insulated conductors 12 which may be connected with the built-in conductors in the cavities 2 and 4 by means well known in the art, but preferably by means of a terminal plug fastened in the mouths of the cavities 2-4. One form of such a terminal plug will be described later with reference to FIGS. 18-24. By means of a corner section as described two casing sections meeting at a corner may be connected with each other by sliding the sliding cover sections into axial abutment with the inner end faces of the corner section and then fastening each sliding cover section to the wall by means of a screw 13. The figure illustrates that insulated conductors 12 can be passed from casing section to casing section meeting at a corner, or from either up through an opening 14 to which a profiled tube may be connected for enclosing insulated conductors connecting a casing section at the floor with a casing section at the ceiling or with network supply wires. If two casing sections are to be connected at a corner without connection of their built-in connectors to external conductors, a corner section without an opening 14 may be used. At an outer corner a corner section may be used having a configuration substantially laterally reversed with respect to that illustrated.

Sliding cover sections corresponding to the section 7, though with omission of the incision 15 at one corner - to provide space for the upper wall of the corner section - can be used for interconnecting aligned casing sections so as to enclose the gap between the sections at an overlap.

By means of the described elements in a moderate assortment it is possible to equip a room with concealed fixed supply conductors along one or more, or conceivably all walls, not only at the floor and/or ceiling but also in intermediate positions where the casings may e.g. form boundaries of panels or fields. It is likewise possible to arrange the casings vertically from floor to ceiling.

Each casing section is provided, in a number of positions distributed over its length, with access modules, of which various embodiments will be described in the following, and thereby it becomes possible in a simple manner to mount and connect up fixed installation components, such as wall sockets, light plugs or other electrical connectors, in any one or several of a large number of positions, or to move about previously mounted components if the need arises.

In the embodiment illustrated in FIGS. 2-9, a cylindrical contact piece 18, 19 is clamped on the built-in conductors 16, 17, as illustrated in FIG. 7, and, if deemed necessary, consolidated by soldering, in each of the access module positions. In one mode of producing the casing section as a commercial product, the contact pieces are clamped on the conductors 16, 17 before these are slid into the cavities 2, 4, e.g. by applying suction to the ends of the cavities remote from those, at which the conductors are introduced.

One or more of the contact pieces may thereafter be held in correct position by means of forked holding plugs 20, 21, which are introduced through slots in the rear wall of the casing section to engage annular grooves 22, 23 of the cylindrical contact pieces 18, 19, as illustrated in FIGS. 7, 8 and 9.

Figures 3, 4:
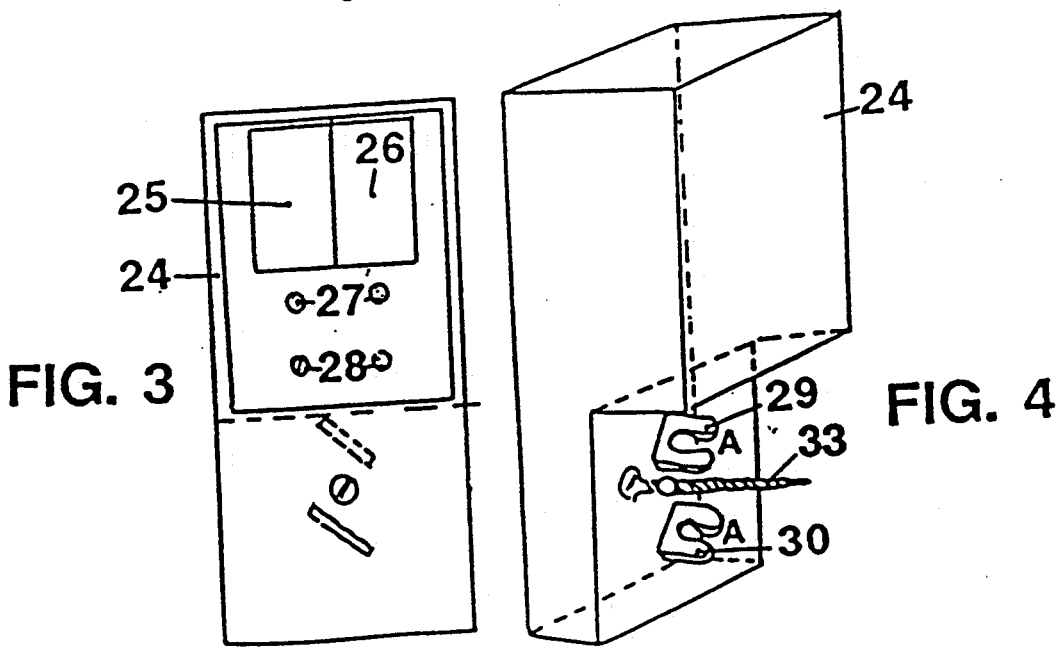
FIG. 3 is a front view of a double wall socket adapted to be mounted on the casing section of FIG. 2.
FIG. 4 a perspective rear view of the wall socket of FIG. 3.

In each access module position, a fixed installation component may be mounted. In FIGS. 3 and 4 such a component is illustrated in the form of a double wall socket 24 with switches 25, 26. The contact sleeves 27, 28 of the wall socket are connected with rearwardly projecting forked contact legs 29, which are arranged at an inclination and can be pushed through inclined slots 31, 32 in the front wall of the casing section to be clamped around the cylindrical contact pieces 18, 19, whereafter the wall socket is fastened to the wall by means of a screw 33, which is passed through a hole 34 of the casing section in the region of the intermediate cavity 3.

Figure 2:
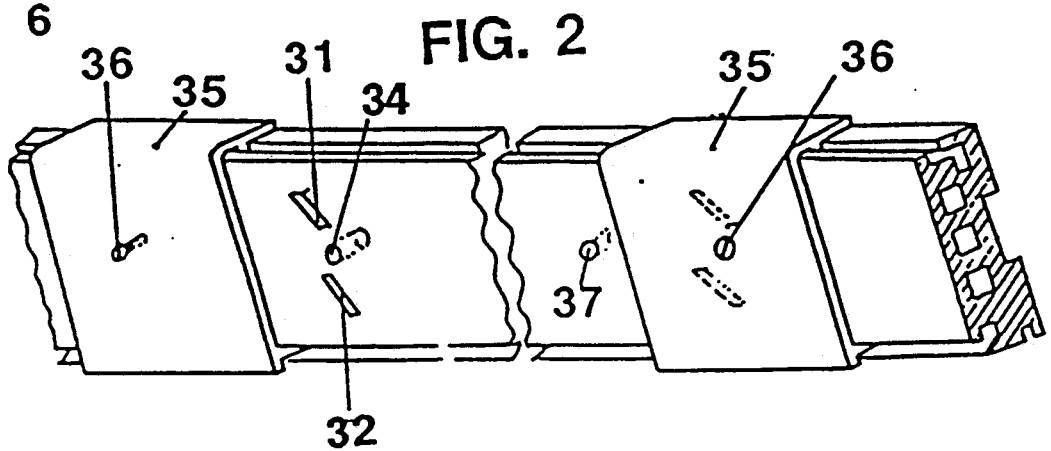
FIG. 2 shows a similar casing section with one non-used access module and another module made ready for the mounting of an installation component.

When the access module is not to be used, the slots 31, 32 are covered by a sliding cover 35 which is fastened to the wall by means of a screw 36 passing through the hole 34, as illustrated to the right in FIG. 2.

When the access module is to be used, the sliding cover 35 is pushed aside, as illustrated to the left in FIG. 2. It is fastened in its new position by passing the screw through another hole, which is shown at 37 for the access module to the right. Hereafter the wall socket 24 can be mounted as previously described.

Figure 10:
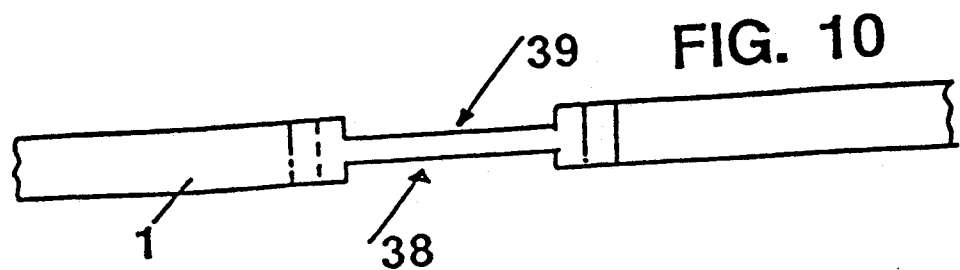
FIG. 10 is a top view of a casing workpiece for use in the making of a casing section according to a further embodiment of the invention.
Figure 11:
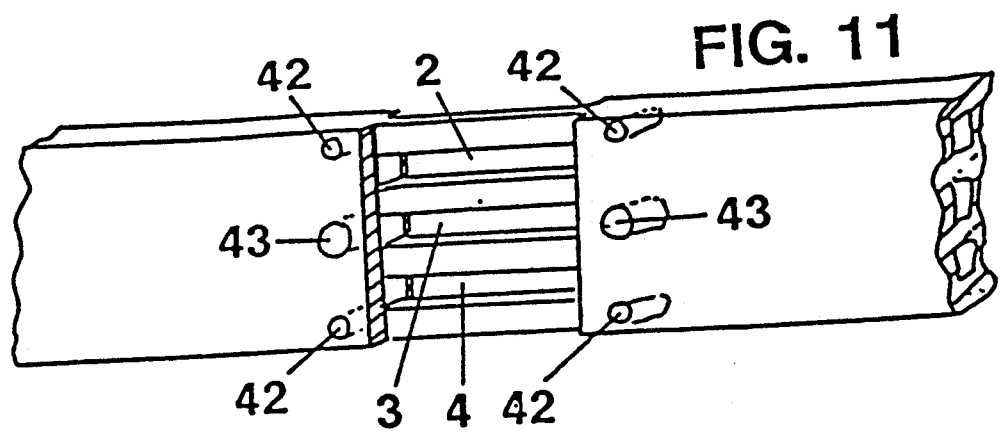
FIG. 11 is a front perspective view of same.

FIGS. 10 and 11 illustrate a stage in the production of a casing section according to a modified embodiment of the invention. These figures show a casing length corresponding to the casing section 1 of FIG. 1, the grooves 5 and 6 having been omitted for simplicity of illustration. In the areas 38 and 39 where access modules are to be provided, the front and rear wall portions of the casing have been cut away, as by milling, to a depth such as to expose the longitudinal cavities 2, 3 and 4. Hereby it becomes possible, in the manufacturing process, to apply contact pieces to the built-in conductors after these have been placed in the cavities, and consequently contact pieces may be used, which cannot, or can only with difficulty be slid longitudinally through the cavities so as to arrive in correct positions for take-off from the front side of the casing. After such contact pieces have been mounted in correct positions on the conductors in the cut-away areas, these areas can be covered by means of a front piece and a rear piece which are clamped and sealed together against the left-over rib-like portions of the casing structure so as to permanently close the profile. By suitably constructing the front piece, various forms of touch and creep free access from the front side of the casing to the built-in conductors may be established.

One example of a casing section, that can suitably be manufactured by the method just described is illustrated in FIGS. 12-16.

Figure 12:
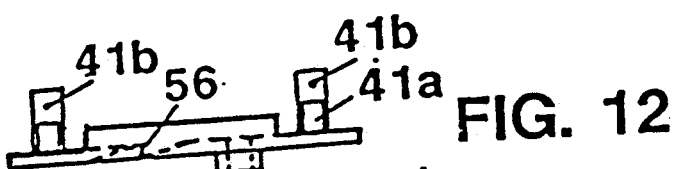
FIG. 12 is a top view of a front piece for use in connection with the workpiece of FIGS. 10 and 11.
Figure 13:
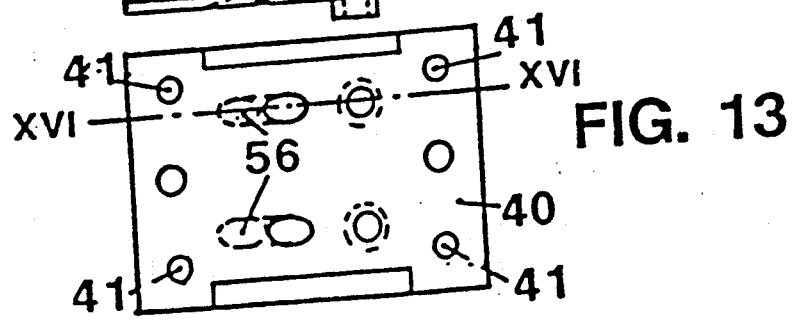
FIG. 13 is a rear view of the front piece of FIG. 12.
Figure 14:
FIG. 14 is a top view of a rear piece for use together with the front piece of FIGS. 12 and 13.
Figure 15:
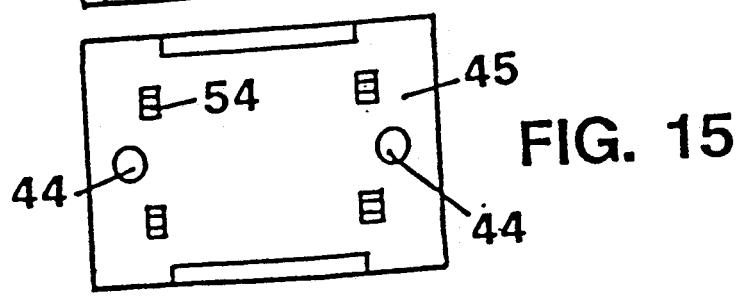
FIG. 15 is a front view of same.

In this example, the front piece 40, FIGS. 12 and 13, is constructed on its rear side with short pegs 41a for engaging in positioning holes 42 on the front side of the casing section at the sides of the cut-away area 38, FIG. 10, and long pegs 41b which can be inserted through holes 43 of the casing section and holes 44 of the rear piece 45 and can then be heat sealed on the rear side of the rear piece 45. The casing section is now permanently closed in the cut-away areas, and the front piece 40 and the rear piece 45 form integrated portions of the front wall and the rear wall of the casing section.

Before the front piece 40 and the rear piece 45 can be clamped and sealed together as described, an electrically conducting clamping member 47, FIGS. 16 and 17, is clamped on each of the conductors. The clamping member 47 has a clamping screw 48 for clamping the clamping member on the conductor 46, and besides a clamping screw 49 with an insulated head 50 which in the finally assembled state can clamp the stripped-off end 51 of an insulated outer wire 52 in a clamping passage 53 formed in the member 47.

When the front piece 40 and the rear piece 45 are clamped together against the casing ribs, the conductors 46 are nested in insulating bucks 54 on the inner side of the rear piece 45, while the insulating head 50 of the clamping screw 49 penetrates into a hole 54 in the front piece 40 surrounded by a collar 55. In this position two inclined access passages 56 provided in the front piece 40 merge into the clamping passages 53 of the clamping members 47.

When all access modules of a casing section have been completed in the manner described, the casing section is ready for sale.

When a casing system comprising such casing sections has been mounted on a wall, an installation component with insulated attachment wire bits 52 can be set up at the location of any one of the access modules by stripping off the insulation from the ends 51 of the wires, introducing these through the access passages 56 into the clamping passages 53 of the clamping member 47 and tightening the clamping screws 49, whereafter the installation component can be fastened to the wall across the access module.

Figure 18:
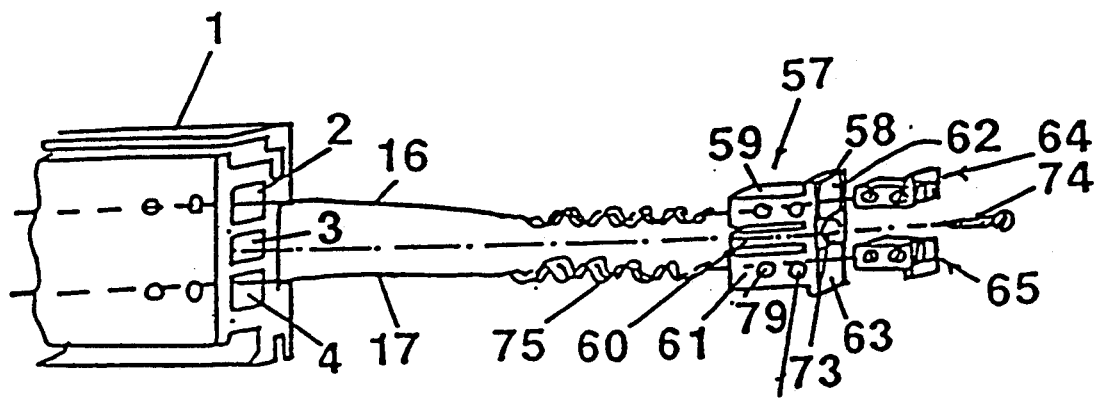
FIG. 18 is a perspective view of the end of a casing section and a terminal plug belonging thereto, the figure illustrating the parts in a stage of the production before the terminal plug has been secured in position.
Figure 19:
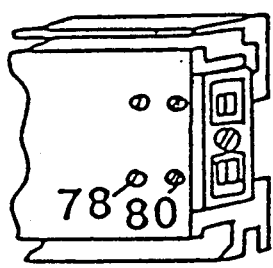
FIG. 19 is a perspective view of the parts of FIG. 18 after the terminal plug has been secured in position.
Figure 20:
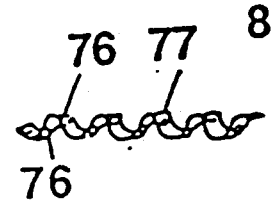
FIG. 20 shows a sinuous spring that may be used for imparting increased elasticity to the built-in conductors, as illustrated in FIG. 18.

FIGS. 18 and 19 illustrate a suitable manner in which a casing section can be closed at its ends by means of terminal plugs, reference being also made to FIGS. 20-24.

Figure 22:
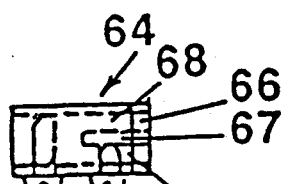
FIG. 22 is a top view of same.
Figure 21:
FIG. 21 is a front view on a larger scale of a contact bushing forming part of the terminal plug of FIG. 18.
Figure 23:
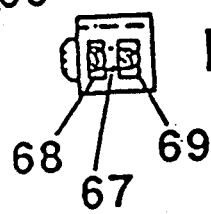
FIG. 23 is an end view of same, as viewed from the right.

The terminal plug illustrated in these figures comprises an insulating housing 57, which has a front plate 58 and three rearwardly extending legs 59, 60 and 61 fitting in the front ends of the longitudinal passages 2, 3 and 4, respectively. The housing 57 has two longitudinal passages 62 and 63 extending from the front end of the housing 57 through the legs 59 and 61, respectively. Each of the passages 62 and 63 serves to receive a contact bushing 64 and 65, respectively. The upper contact bushing 64 is illustrated in FIGS. 21-23, and the lower contact bushing 65 is identical, though inverted with respect to a horizontal plane. At its front end, the bushing 64 has an upwardly protruding edge portion 66 adapted to engage with a stop face (not shown) in the passage 62. The front half of the interior of the bushing 64 is subdivided by means of a partition 67 so as to form two vertical flat slots 68 and 69.

Figure 24:
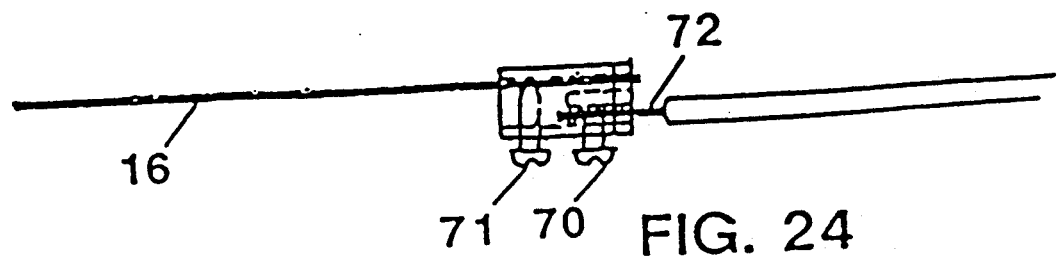
FIG. 24 is a view corresponding to FIG. 21, but with a built-in conductor and a connecting conductor clamped in the contact bushing.

Clamping screws 70 and 71 are provided for clamping the denuded end of a connecting conductor 72 against the partition 67, and the end the built-in conductor 16 against the opposed inner wall of the bushing 64, respectively, as illustrated in FIG. 24.

The middle leg 60 of the insulating housing 57 has a hole 73 for receiving a screw 74, by means of which, upon insertion of the terminal plug into the end of the casing section, the material of the leg can be expanded so as to hold the terminal plug firmly in position by friction.

In the embodiment illustrated, the built-in conductors are constructed with elasticized portions 75 formed by passing each conductor in a zig-zag path through staggered holes 76 of a sinuous spring 77, e.g. consisting of beryllium-bronze. The provision of such elasticized portions is advantageous in the case of casing sections of great length, because the built-in conductors may be subjected to substantial tensile stress if the casing section is bent during transportation or handling. In casing sections of shorter length, elasticized portions are not required.

If, in the manufacturing process, the conductors 16 and 17, with contact pieces 18,19 secured thereto in correct positions for the access modules, are slid into and through the longitudinal cavities 2 and 4 from one end of the casing section, as described with reference to the embodiment of FIGS. 2-9, the conductors may at that end beforehand be passed through the slots 68 and clamped in the bushings 64, 65 by directly applying a screwdriver to the heads of the clamping screws 71. The same procedure may be used at the other end of the casing section, if the conductors are constructed with elasticized portions 75, so that the conductor ends can be pulled out from the mouths of the cavities of the casing section, while the tightening of the clamping screws 71 is taking place. Otherwise the clamping screws 71 will be accessible after insertion of the terminal plug through holes 78 in the front wall of the casing section and holes 79 in the insulating housing 57.

Further holes 80 and 81 in the front wall of the casing section and in the insulating housing 57, respectively, are provided for providing access to the heads of the clamping screws 70, by means of which connecting conductors 71 can be clamped in the slots 69 when a casing system is being set up in a room with use of casing sections with terminal plugs of the kind described.

When the terminal plugs of the kind described are used in connection with the embodiment of FIGS. 2-9, these terminal plugs may suffice for holding the built-in conductors 16,17 in a position such that the contact pieces 18,19 are correctly positioned behind the access slots 31,32, the length of the contact pieces being so chosen that their position relatively to the slots is not critical. However, for casing sections of a relatively great length it is recommendable to use holding plugs 20,21, as described with reference to FIGS. 7-9, for holding at least one pair of contact pieces 18,19 in accurate position.

FIG. 25 illustrates a connector section 82 which may be used at one or more junctions between adjacent casing sections. The connector section 82 consists of a short block 83 of insulating material with embedded strips of electrically conducting material extending in the form of pegs 84 at both ends of the block. When using the connector section, the pegs 84 are introduced into the clamping slots 69 of the terminal plugs at the adjoining ends of the two casing sections, and are clamped therein by means of the clamping screws 70. A sliding cover section 85 is then slid into position so as to cover the block 83 at an overlap, and is fastened to the wall by means of a screw 86 passing through a hole 87 of the block.

Alternatively the built-in conductors of adjacent casing sections can be interconnected by means of loose insulated conductors which are clamped in the slots 69, as previously described with reference to FIG. 24.

FIG. 27 shows an end section 88 for use in cases where an end of a casing length along a wall is not to be connected to further parts of the casing system. As will be seen, the end section 88 is very similar to the corner section 8 shown in FIG. 1, with the exception that the second leg of the corner section has been replaced by a flat wall 89, which is flush with the front wall of a sliding cover (not shown) corresponding to the sliding cover 7 in FIG. 1. 90 is a screw by means of which the end section can be fastened to a wall.

At its top the end section 88 has a square opening (corresponding to the opening 14 in FIG. 1) which is closed by means of a plug 91. In this form the end section is used, when the built-in conductors of the adjacent casing section are not to be connected to external conductors. If, on the contrary, such a connection is to be established, the plug 91 may be removed, and a transition section may be connected to the square opening. One form of a transition section is shown in FIG. 28. It comprises a lower portion 93 of square cross-section, and an upper portion 94 of triangular cross-section for receiving the end of a triangular tube or casing fitting in the corner of a room. In such a triangular tube or casing insulated conductors may be placed, which are connected to the built-in conductors of the adjacent casing section and serve to connect these e.g. with the built-in conductors in casing sections mounted at the ceiling, or with a network supply switch.

The transition section of FIG. 28 can also be used in connection with the corner section 8 of FIG. 1. It will be obvious to those skilled in the art that other forms of transition sections can be used, if it is e.g. desired to use a flat tube or casing for the external conductors instead of a triangular one.

EXAMPLE

FIG. 29 illustrates how a casing length, e.g. from one corner of a room to another, can be built up from two end or corner sections 8, 88, one casing section 1 and two sliding covers 7.

The various dimensions are indicated in FIG. 29 as follows:
 a=length of wall to be covered,
 b=length of casing section,
 c=length of end section or one leg of corner section,
 d=length of gap between casing section and end or cover section,
 e=length of overlap between casing section and sliding cover,
 f=length of sliding cover.
In the example, the following conditions apply:
 c=50 mm,
 d=minimum 50 mm,
 e=minimum 50 mm.
For varying lengths of wall a to be covered, a casing system can now be composed from standard elements in accordance with the following table:

| Length of wall a | Length of casing section b | Length of sliding cover f |
| --- | --- | --- |
| 0.7–0.9 m | 500 mm | 250 mm |
| 0.9–1.2 m | 500 mm | 400 mm |
| 1.2–1.7 m | 1000 mm | 400 mm |
| 1.7–2.2 m | 1500 mm | 400 mm |
| 2.2–2.7 m | 2000 mm | 400 mm |
| 2.7–3.2 m | 2500 mm | 400 mm |
| 3.2–3.7 m | 3000 mm | 400 mm |
| 3.7–4.2 m | 3500 mm | 400 mm |
| 4.2–4.7 m | 4000 mm | 400 mm |
| 4.7–5.2 m | 4500 mm | 400 mm |
| 5.2–5.7 m | 5000 mm | 400 mm |
| 5.7–6.2 m | 5500 mm | 400 mm |
| 6.2–6.7 m | 6000 mm | 400 mm |

Similarly, if two casing sections 1 are interconnected by means of the connector section 82 of FIG. 25 with cover 85 of FIG. 26, wall lengths from 6.7–12.7 m can be covered, and with three interconnected casing sections wall lengths up to 18.7 m, etc., and similar tables can be set up for determining the appropriate composition in each individual case.

Conversely, should a consumer wish to build up a casing system from casing sections not exceeding a length of, say 3000 mm, wall lengths from 3.7–6.7 m could be covered by using two casing sections within the range of 500 mm–3000 mm interconnected by means of a connector section 82, etc.

Figure 30:
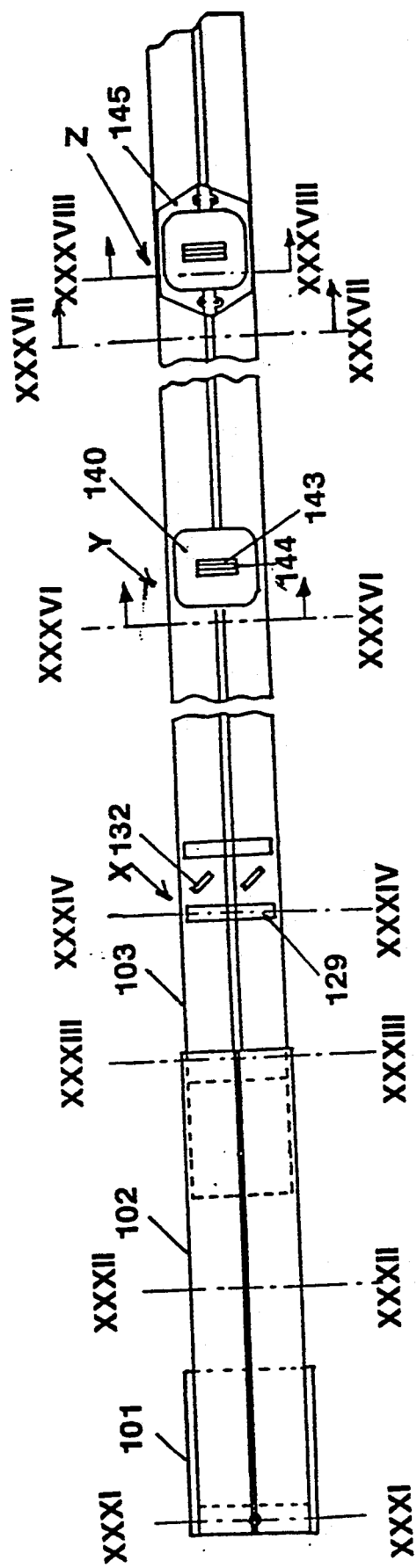
FIG. 30 illustrates on a reduced scale a still further embodiment of the invention in the form of a corner section, a sliding cover section and a casing section, all forming part of a casing length running along the intersection of a vertical wall and a horizontal ceiling, as seen in front view in an upwardly inclined direction as indicated by the arrows XXX in FIG. 31.

FIG. 30 illustrates a casing length adapted to be mounted in an inclined position along the intersection of a vertical wall and a horizontal ceiling so as to form a decorative element which may be referred to as "electrical stucco". The casing length illustrated comprises an end section 101, a sliding cover section 102 and a casing section 103, all made from an extruded plastics material.

Figure 32:
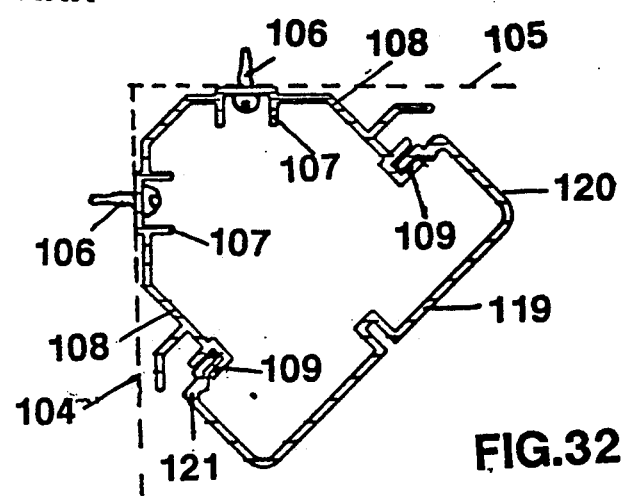
FIG. 32 is a section along the line XXXII—XXXII in FIG. 30.
Figure 33:
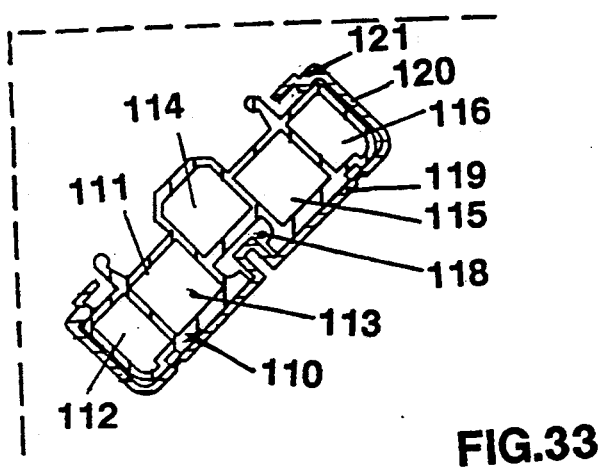
FIG. 33 is a section along the line XXXIII—XXXIII in FIG. 30.
Figure 34:
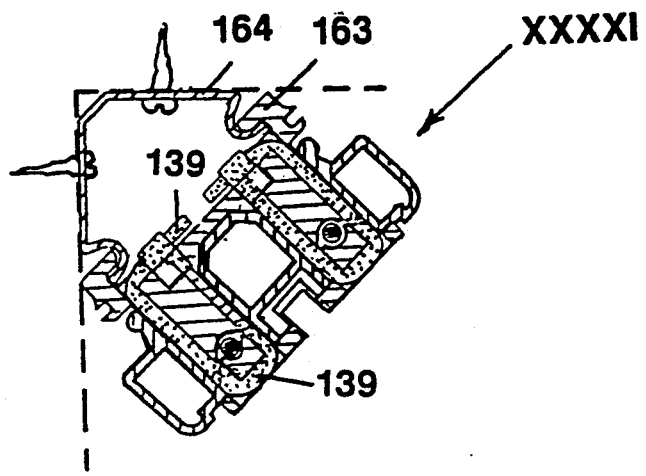
FIG. 34 is a section along the line XXXIV—XXXIV in FIG. 30.
Figure 35:
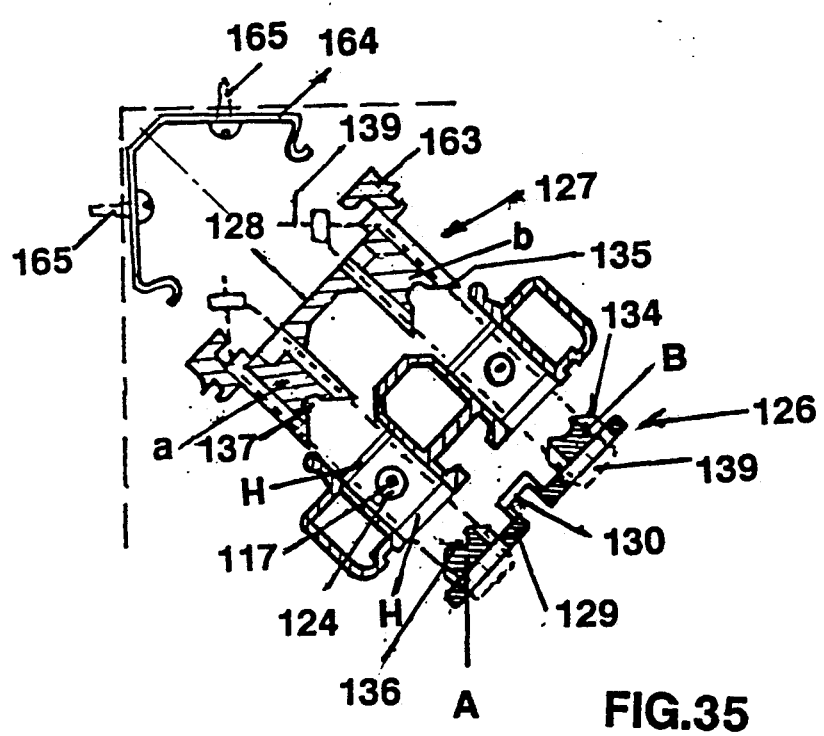
FIG. 35 is an exploded sectional view corresponding to FIG. 34.

As will be seen in FIG. 32, the end section 101 has a profile fitting in the angle between the wall 104 and the ceiling 105, to which it can be attached by means of screws 106,106. The profile of the end section 101 is formed with channel portions 107, 107, accomodating the heads of the screws 106,106, and with forwardly extending side portions 108,108 which at their front edges are constructed with outwardly open guiding grooves 109,109.

The casing section 103 has a front wall 110 and a rear wall 111 between which a number of longitudinal cavities 112, 113, 114, 115, 116 run side by side from one end of the casing section to the other. All of these cavities may be used for accomodating conductors belonging to a system of conductors for which the casing system is used. These will include at least two power supply conductors 117, 117 accomodated in the cavities 113, 115.

The central cavity 114 is rearwardly offset relative to the other cavities to provide space for an outwardly open undercut groove 118 serving for the fixation of auxiliary structural elements, as will be explained later.

The sliding cover section 102 has a front wall 119 and two side walls 120, 120 carrying inwardly extending guiding ribs 121.

In the finished installation, as illustrated in FIG. 1, the sliding cover section 102 closes the space within the end section 101 and at the same time covers the gap between the ends of the end section 101 and the casing section 103, and is in positive sliding engagement with both, viz. by engagement of the guiding ribs 121 of the sliding cover section 102 in the guiding grooves 109 of the end section 101 and behind the rear wall 111 of the casing section 103. From this position the sliding cover section 102 may be slid to the right in FIG. 1 so as to expose the interior of the end section 101 and the left hand end of the casing section 103. Now, connection may be established from the conductors in the longitudinal cavities of the casing section 103, e.g. by means of cables passing through holes 122 of an end plug 123 fitted in the end section 101 and through the contiguous wall of the building to conductors in a similar casing system in an adjoining room. If no such cable connections are to be established, the interior of the end section 101 will remain empty. In either case the sliding cover section will be slid back to the position illustrated in FIG. 1, in which it covers the left hand end of the casing section 103 and forms a neat termination of the casing length running in the whole length of a wall. In this position the sliding cover section is fixed to the end plug 129 by means of a screw 183.

Similarly, a sliding cover section may be used for covering a gap between successive aligned casing sections or between a casing section and one leg of a corner section, as will be later described.

Each casing section is constructed with a number of access modules distributed over its length. These may be selectively used for establishing electrical connection from installation components to the power supply conductors in the casing section. FIG. 1 illustrates at X an access module ready for use, at Y an access module not in use, and at Z an access module in use for receiving a connector, to be described later.

Figure 41:
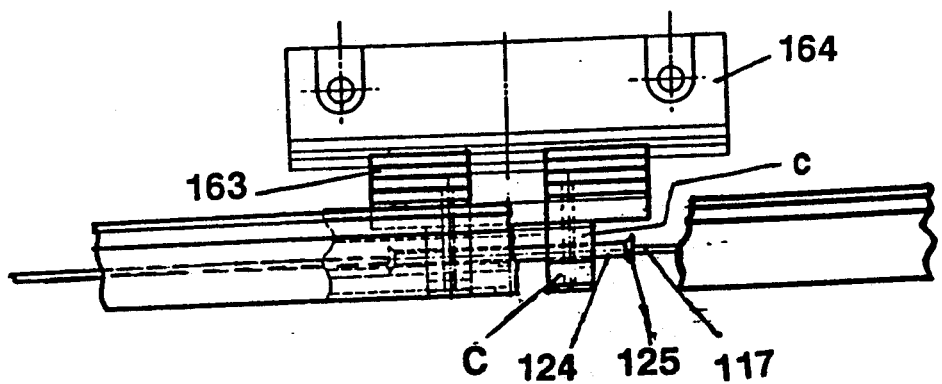
FIG. 41 is a side view, as seen in the direction of the arrow XXXXI in FIG. 34, illustrating the suspension of a casing section from a wall and a ceiling by means of an angular fixture and a front and rear holder assembly, a portion of the casing section being broken away.

In the area of each access module, the power supply connector 117 in each of the cavities 113, 115 is provided with a cylindrical contact piece 124 with flared ends 125, as best seen in FIG. 41. The contact piece 124 is clamped around the respective conductor 117 and, if deemed necessary, consolidated by soldering, similarly as previously described with reference to FIG. 6.

Figure 39:
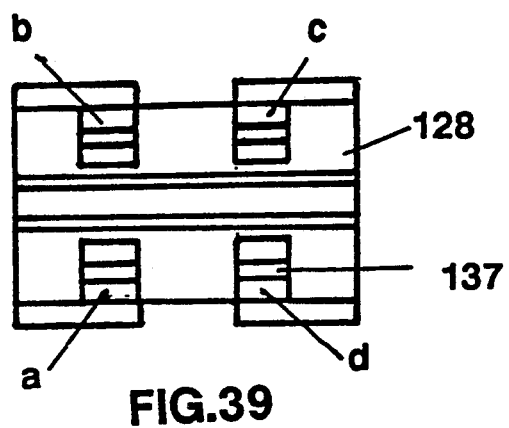
FIG. 39 is a rear view of a front holder also illustrated in FIG. 35.
Figure 40:
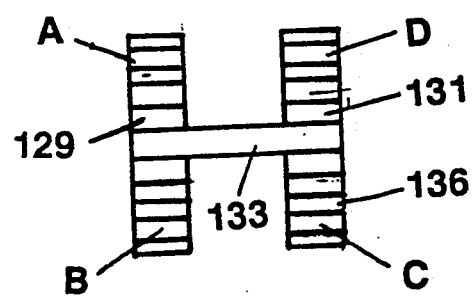
FIG. 40 is a front view of a rear holder also illustrated in FIG. 35.

Moreover, in the area of each access module, the casing section 103 is constructed with a holder assembly comprising a front holder 126 and a rear holder 127, each having four legs A, B, C, D and a, b, c, d, respectively, cf. FIGS. 39 and 40, penetrating into the cavities 113, 115 through rectangular holes H in the front and rear walls, respectively, of the casing section 103, in which they fit snugly. The legs a and b form a pair penetrating into the cavities 113, 115, respectively, and the same applies to the legs c and d, the two pairs being spaced in the longitudinal direction of the casing section. All four legs project from a base member 128 fitting against the rear wall 111 of the casing section.

Similarly, the legs A, B, C, D of the front holder form pairs A, B and C, D located opposite the pairs a,b and c,d. The legs A,B project from a transverse bridge member 129 fitting in a recess of the front wall 110 of the casing section and having a depression 130 fitting in the front groove 118 in the front wall 110 of the casing section. The legs C,D are similarly connected by means of a bridge member 131 having a depression like 130. The two bridge members 129 and 131 are interconnected at their depressed portions 130 by means of a thin longitudinal bridge member 133 fitting in the bottom of the front groove 118.

The mutually facing ends of the legs A, B, C, D of the front holder 26 and the respective legs a, b, c, d of the rear holder are formed with mutually matching end faces 134 and 135 which in the middle have concave face portions 136, 137 which grip around the contact pieces 124 on the conductors 117,117 to hold these in well defined positions in their respective cavities 113,115. Owing to the flared ends 125 of the contact pieces 124, the conductors 117,117 are at the same time locked against axial displacement, however, with a certain clearance to allow for manufacturing inaccuracies, temperature variations, etc..

In front of each contact piece 124, the front wall 110 of the casing section has two inclined access slots 132 through which forked contact legs of a connector can be pushed into contact making engagement with the contact pieces 124, similarly as previously described with reference to FIGS. 3-5.

In manufacturing the casing section the contact pieces 124 are clamped around the conductors 117 in positions at a spacing corresponding to that of the access modules, and the conductors 117,117 are then introduced into the cavities 113, 115 from one end of the casing section. When the contact pieces are in correct positions in the access modules, the front and rear holders 126, 127 are pushed into the cavities 113, 115 in each contact module to grip the contact pieces 124 and to engage the bridge member 129 and the base member 128 with the front and rear surfaces of the casing section 103. In this position the front and rear holders are permanently interlocked, e.g. by means of self-locking straps 139 of well known kind which are tightened around body portions of both holders. All access modules are now ready for use. An access module ready for use is illustrated at X in FIG. 30.

Figure 36:
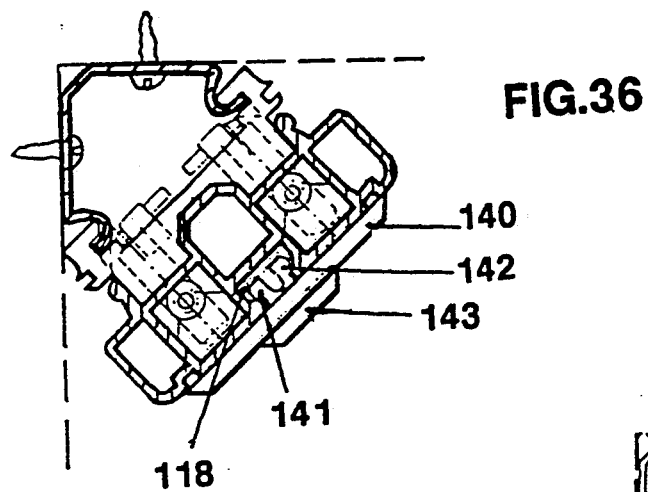
FIG. 36 is a section along the line XXXVI—XXXVI in FIG. 30.

When an access module is not to be used for accomodating a connector, the access slots 132 should be covered by means of a front cover 140, as illustrated at Y in FIG. 30, and in FIG. 36. The front cover illustrated is a flat cover of square configuration with rounded corners. On its rear side it is provided with fixation noses 141,142, which in one angular position of the cover are freely slidable along the fixation groove 118, but by a 90° turning of the cover 140 are clampable in the inner, undercut portion of the fixation groove 118 at a firm grip to lock the cover against accidental removal. For the turning of the cover from its loose position to its locked position, the cover is provided on its front face with tool engageable means illustrated in the form of two projections 143 forming a groove 144 for a screw driver.

Figure 37:
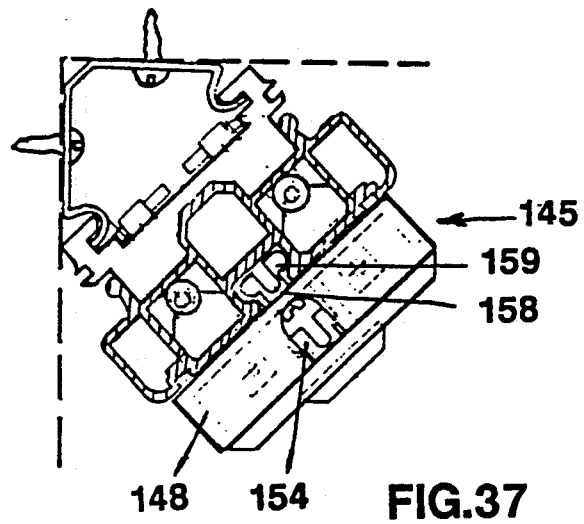
FIG. 37 is a section along the line XXXVII—XXXVII in FIG. 30.
Figure 38:
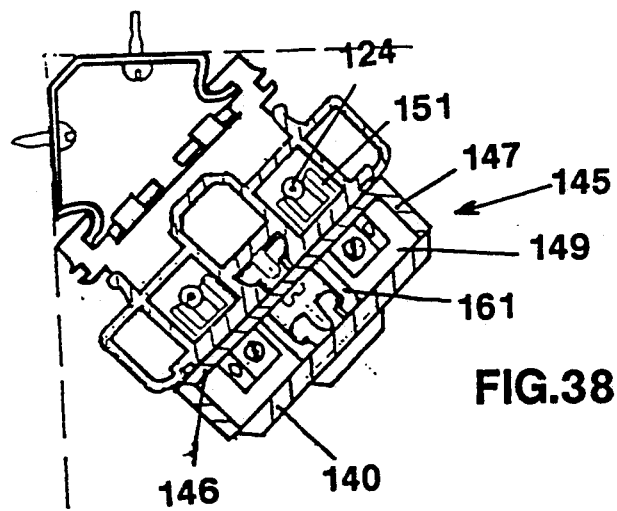
FIG. 38 is a section along the line XXXVIII—XXXVIII in FIG. 30.

When an access module is to be used, the cover 140 is turned loose and removed, and a connector is placed on the access module. In principle, the connector can be in the form of a wall socket constructed as previously described with reference to FIGS. 3-5. A different type of connector is illustrated at Z in FIG. 30, and in FIGS. 37, 38 and 42. This connector has a base member 145 comprising a flat bottom 146 and side and end walls 147, 148 forming a shallow open cavity 149. On the bottom 146 are mounted two terminal blocks 150 of solid copper. The blocks have a square cross-section which is tilted at the same angle as the access slots 132. A thin flat contact leg 151 is clamped to a side face of each of the terminal blocks 150 by means of a screw 182 and extends through the bottom 146 of the connector. The extending ends of the contact legs 151 are adapted to be pushed through the access slots 132 and are forked for contact making engagement with the contact pieces 124.

The terminal blocks 150 also have bores 152 for receiving the bared ends of the two conductors of an insulated wire, and terminal screws 153 for clamping said bared ends in the bores 152. The insulated wire can be passed through a slot 154 in either one of end walls 147,148 and can be clamped for pull release by means of screws 155 acting on a clamping member 156, the ends of which are slidable in a transverse slot 157 provided in the end walls 147,148. Such a wire may e.g. be used for the installation of a lamp suspended from the ceiling. Wire guides (not shown) attached to the casing section by means of fixation noses, such as 141, 142, may be used for the neat arrangement of such wires.

A plug 158 is rotatably mounted in the bottom 146 and is provided at its rearwardly extending end with fixation noses 159 corresponding to the noses 141,142 of the cover 140. At its free inner end, the plug 158 has a screw driver notch 160. Thus, when the connector has been placed in its contact making position, it can be fixed in that position by turning the plug 158.

At either side of the plug 158, the bottom 146 is constructed with two longitudinal projections 161 of a shape to form a fixation groove 162 corresponding to that of the casing section. By means of this fixation groove a cover 140 may be firmly attached to the connector to close its cavity.

Reverting now to the holder arrangement illustrated in FIGS. 34, 35, 39, 40, 41, it will be seen that the base member 128 of the rear holder is constructed at its back with longitudinally extending channel sections 163 for snap engagement with an angular fixture 164 attached to the wall and ceiling by means of screws 165. Thus, it will be seen that in the area of each access module the conductors 117 with their contact pieces 124 are supported directly from the wall and ceiling by means of the holder assembly 126,127. This is a very important arrangement because the holders can be molded from a plastics material having a greater hardness at elevated temperatures than the plastics materials available for extrusion in the making of the casing sections. In fact, the access modules constitute the delicate spots in which heat may be developed in the case of defective contact making, and it is therefore important that the structure carrying the conductors in these areas should be capable of standing a hardness test at the temperature reached in a load test.

When a casing section is suspended from the ceiling and the wall in the access module areas, as described, no other means are required for attaching the casing section to the building structure.

Figure 43:
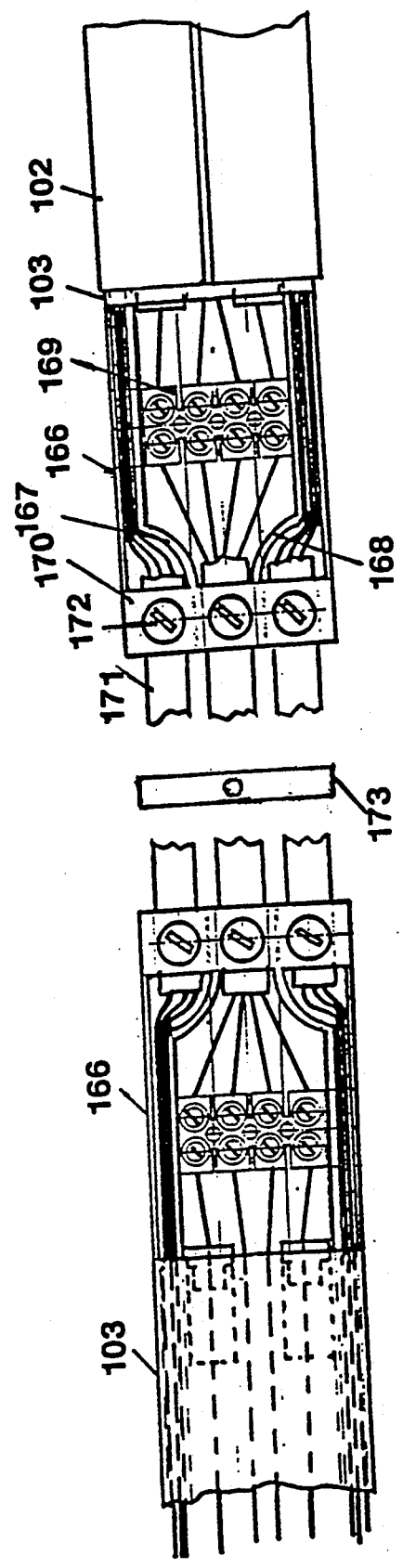
FIG. 43 is a front view illustrating the establishment of cable connections between two aligned casing sections, each being provided at its end with a terminal box.
Figure 31:
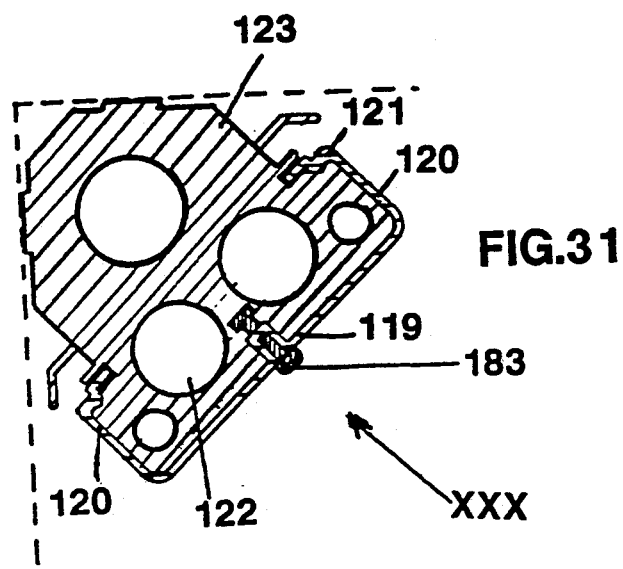
FIG. 31 is a section on an enlarged scale along the line XXXI—XXXI in FIG. 30.

FIG. 43 shows two aligned casing sections 103, each of which is constructed at its end with a terminal box 166,166. As delivered to the user, terminal boxes at each end form integral parts of the casing sections. The casing sections 103 are identical to that previously described. Each terminal box 166 has the same outer profile as the casing section 103, but the front wall is omitted, and the interior of the terminal is divided into three separate compartments by means of insulating partitions 167,168. In the middle compartment a terminal block 169 is mounted on the rear wall of the box. At its free end the terminal box has an end wall with passages for receiving multi-core insulated cables 171, which can be clamped in the passages by means of clamping screws 172.

The terminal boxes facilitate the establishment of connections between conductors in the cavities 112,113,114,115,116 in one casing section and corresponding conductors in a next following casing section by means of suitable multi-core cables. Thus, in the example shown, a number of insulated signal conductors in the cavities 112 and 116, two non-insulated supply conductors in the cavities 113, 115 and two insulated supply conductors in the cavity 114 are connected to the corresponding conductors in the corresponding cavities of the next following casing section. When the connections have been established, a sliding cover section 102, which has been pushed aside on the right hand casing section during the performance of the connecting operation, is slid back into position to cover the gap between the casing sections, including the terminal boxes which are thereby closed so that the compartments formed by the partitions 167,168 are completely isolated from one another. The sliding cover section can now be fixed relative to the wall by means of a fixation screw, not shown, which is screwed into a threaded hole in a bracket 173 which is permanently attached to the wall and/or ceiling and has a configuration such that it is also covered by the sliding cover section.

In order to provide space for carrying out the connecting operation (the "wiring" of the system), the sliding cover section must have a length sufficient to cover a gap of substantial length between successive casing sections.

Where an end of a casing section is located next to a leg of an end section or a corner section, the terminal box of the casing section will serve to establish connection between the conductors in the cavities of the casing section to external cables or, as far as a corner section is concerned, to the conductors in the cavities in the casing section next to the other leg of the corner section.

FIG. 44 illustrates diagrammatically a corner section having legs 201, 202, which are hingedly connected with each other by means of hinge parts 203,204,205,206. Such a corner section is suitable for use in corners having different angles between the walls, and both for inner and outer corners. FIG. 44 also illustrates attachments 207 for supporting external insulated cables emanating from the terminal box of an adjacent casing section.

It will be understood that by using flattened fixtures instead of the described angular fixture 164 and shallow end and corner sections the casing system described with reference to FIGS. 30-44 can be constructed for attachment to a vertical wall of a building with the casing sections in an upright instead of an inclined position.

The term "wall", as used in this application, is to be understood as also including ceilings and other surfaces of building structures in the widest sense of this concept.

I claim:

1. A casing system for laying electric supply conductors and, if desired, signal conductors along the outer surface of walls of buildings, comprising unitary elongated casing sections of insulating material and of a variety of fixed lengths, each such section having a front wall and a rear wall and at least two longitudinal cavities extending from end to end of the section in positions mutually displaced in a transverse direction parallel to said front wall, an electric supply conductor being mounted in each of at least two such longitudinal cavities at a loose fit and being held therein against longitudinal displacement, each casing section being constructed with a number of access modules distributed over the length of the section and each providing access for the touch and creep proof connection of outer conductors or installation components from the front side of the casing section to the supply conductors in the longitudinal cavities, sliding cover sections profiled for positive sliding engagement with said casing sections and having a shape and a length such as to be capable of covering a gap of substantial length between two aligned casing sections, corner sections having two legs disposed at an angle to each other, and end sections having one leg, each leg being shaped for positive sliding engagement with a sliding cover section in such a manner as to define a confined space between the sliding cover and the leg and to be capable of covering a gap of substantial length between the leg considered and the end of an aligned casing section, said sliding cover sections being constructed for fixation relative to a wall of a building along which one or more casing sections are mounted.

2. A casing system as in claim 1, in which the front wall of a casing section is formed with an outwardly open undercut groove, in the following referred to as fixation groove, for the fixation of auxiliary structural elements to the front wall of the casing, each such auxiliary element having fixation noses, which in one angular position are freely slidable along the fixation groove and by forcible turning of the noses in the fixation groove are clampable in the inner, undercut portion of the fixation groove at a firm grip.

3. A casing system as in claim 1, in which a casing section is constructed at least at one end with a terminal box having the same exterior profile as the casing section, but no front wall, a terminal block being mounted in said terminal box, said terminal box being adapted to establish electrical connections between conductors in the cavities of the casing section and conductors of insulated cables extending out of the terminal box.

4. A casing system as in claim 1, in which each supply conductor is provided with a contact piece in the area of each access module, and access slots are provided in the front wall of the casing section in front of each such contact piece, the system further comprising connectors each having forked contact legs adapted to be pushed though said access slots into contact making engagement with said contact pieces, thereby defining a position of use of the connector, means for securing said connector in its position of use, and cover means adapted to be secured in a position to cover said access slots belonging to an access module at any time not in use for accomodating a connector.

5. A casing system as in claim 4, in which said access slots are inclined relative to the longitudinal direction of the casing section.

6. A casing system as in claim 4, in which the supply conductors are held in position in their cavities by holding means penetrating into the interior of the casing section at least from the rear side thereof and engaging the contact pieces.

7. A casing system as in claim 6, in which matching interlocked holding means are provided penetrating into the interior of the casing section from the rear side and the front side, respectively.

8. A casing system as in claim 6, in which the holding means penetrating into the casing section from the rear side thereof are constructed for attachment to a wall of a building, thereby constituting means for suspending the casing section in position along the wall of a building.

9. A casing system as in claim 8, in which the holding means are molded from a synthetic material having great hardness at elevated temperatures.

10. A casing system as in claim 4, in which the front wall of a casing section is formed with an outwardly open undercut fixation groove, and said cover means for covering said access slots consists of a separate cover which is applicable to the front face of the casing section and is constructed on its rear side with fixation noses, which in a first angular position of the cover are loosely received in the fixation groove and by forcible turning of the cover to a second angular position are clampable in the inner, undercut portion of the fixation groove at the firm grip, the cover being provided at its front side with tool engageable means for use in turning the cover from said first angular position to said second angular position and vice versa.

11. A casing system as in claim 4, in which the front wall of a casing section is formed with an outwardly open undercut fixation groove, and said connector has a base portion carrying said forked contact legs and a fixation element rotatably mounted in said base portion, said fixation element being constructed on the rear side of the base portion with fixation noses, which in a first angular position of the fixation element are loosely received in the fixation groove and by forcible turning of the fixation element to a second angular position are clampable in the inner, undercut portion of the fixation groove at a firm grip, the fixation element being provided with tool engageable means accessible from the front side of the base portion for use in turning the fixation element from said first angular position to said second angular position and vice versa.

12. A casing system as in claim 11, in which the base portion of the connector has an open front and a bottom formed with two parallel projections of a shape to form an outwardly open undercut fixation groove for the fixation of a cover which is constructed on its rear side with fixation noses, which in a first angular position of the cover are loosely received in the fixation groove formed between said projections and by forcible turning of the cover to a second angular position are clampable at a firm grip in the inner, undercut portion of the fixation groove formed between said projections.

* * * * *